R. H. VILLARD.
BALL BEARING HANGER.
APPLICATION FILED DEC. 18, 1912.

1,083,780.

Patented Jan. 6, 1914.

Inventor
Richard H. Villard,

Witnesses

By Wilkinson, Witherspoon
Mackay  Attorneys.

UNITED STATES PATENT OFFICE.

RICHARD H. VILLARD, OF ATLANTA, GEORGIA, ASSIGNOR OF ONE-HALF TO WILLIAM E. ARMISTEAD, OF ATLANTA, GEORGIA.

BALL-BEARING HANGER.

1,083,780.  Specification of Letters Patent.  Patented Jan. 6, 1914.

Application filed December 18, 1912. Serial No. 737,519.

*To all whom it may concern:*

Be it known that I, RICHARD H. VILLARD, a citizen of the United States, residing at Atlanta, in the county of Fulton and State of Georgia, have invented certain new and useful Improvements in Ball-Bearing Hangers; and I do hereby declare the following to be a full, clear, and exact description of the invention, such as will enable others skilled in the art to which it appertains to make and use the same.

My invention relates to improvements in hangers adapted for use to support swinging bodies carrying heavy weights, such as hammocks, cots, swings, or the like; and it is especially intended to provide an antifriction hanger, which will swing freely, and yet which will not emit a creaking sound, which is common in the ordinary hangers used in connection with hammocks, cots, or the like.

My invention will be understood by reference to the accompanying drawings, in which—

Figure 1:
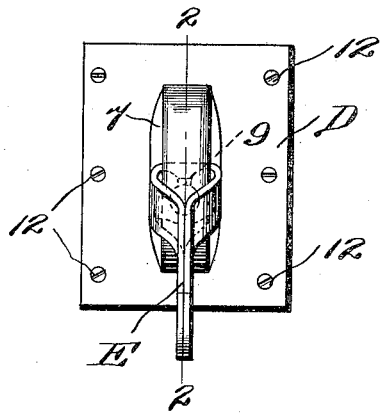
Figure 2:
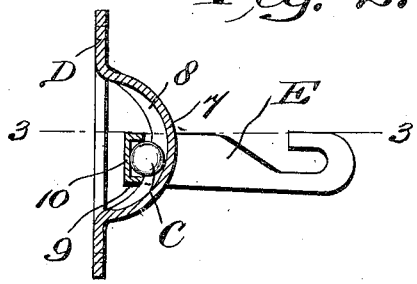

Figure 1 is a front view; Fig. 2 shows a section along the line 2—2 of Fig. 1, and Fig. 3 is a plan view taken on the line 3—3 of Fig. 2.

Figure 3:
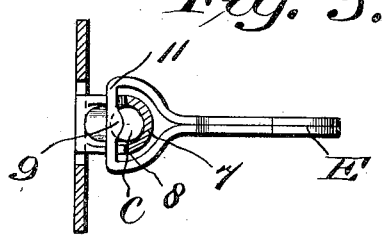

Referring to the construction in detail the device consists of a plate D having pressed out of its center a grooved arch 7, the sides of which are curved over, as at 8, shown most clearly in Figs. 2 and 3; and in this groove in said arch, the ball C travels. The hook E is preferably pressed out of a metal blank, formed with an eye 11, the central portion of which is provided with ears 9, that are bent upwardly, as shown in Figs. 2 and 3, to hold the ball in place. One side of said ball engages in the groove 8 in the arch 7, as already described, and the other side of the ball bears against the bottom 10 of the cross piece of the eye 11. The ends of the plate are then bent together in the form shown most clearly in Fig. 3, to form a single hook. Thus, in this form of construction, both the plate D and the hook E are stamped out of sheet metal, and bent to form with the ball C an antifriction hanger.

The plate D may be secured to the supporting device, not shown, in any convenient way, as by screws 12, shown in Fig. 1.

It will be noted that the device comprises a fixed member, adapted to be secured to the post, or other supporting device, and a hook hinged to said fixed member, but spaced therefrom by means of a ball, which ball is held in a groove or recess partly in each of the members.

It will be obvious that various modifications might be made in the device, which could be used without departing from the spirit of my invention.

Having thus described my invention, what I claim and desire to secure by Letters Patent of the United States is:

A hanger comprising a metal plate having an arched portion struck-out therefrom, and said arched portion having its sides bent inwardly to provide a channel; a sheet metal strip shaped to form an eye member engaging said arch portion and folded upon itself to provide a hook, one portion of said eye member having a pair of inwardly disposed ears forming a recess disposed opposite to the aforesaid channel; and an anti-friction ball fitting within the space between said recess and the channel.

In testimony whereof, I affix my signature, in presence of two witnesses.

RICHARD H. VILLARD.

Witnesses:
R. PEARL SPEELMAN,
C. M. O'FARRELL.

Copies of this patent may be obtained for five cents each, by addressing the "Commissioner of Patents Washington, D. C."